United States Patent
Yoo

(10) Patent No.: US 7,503,868 B2
(45) Date of Patent: Mar. 17, 2009

(54) AUTOMATIC SPEED CHANGING DEVICE

(75) Inventor: Moon-Soo Yoo, Cheongju-si (KR)

(73) Assignee: MBI Co., Ltd., Cheongju-Si (KR)

( * ) Notice: Subject to any disclaimer, the term of this patent is extended or adjusted under 35 U.S.C. 154(b) by 0 days.

(21) Appl. No.: 12/012,553

(22) Filed: Feb. 4, 2008

(65) Prior Publication Data

US 2008/0182707 A1     Jul. 31, 2008

Related U.S. Application Data

(60) Division of application No. 11/346,995, filed on Feb. 3, 2006, now Pat. No. 7,351,180, which is a continuation of application No. PCT/KR2004/001979, filed on Aug. 6, 2004.

(30) Foreign Application Priority Data

| Aug. 6, 2003 | (KR) | 10-2003-0054415 |
|---|---|---|
| Aug. 29, 2003 | (KR) | 10-2003-0060167 |
| Aug. 2, 2004 | (KR) | 10-2004-0060949 |

(51) Int. Cl.
*F16H 3/44* (2006.01)

(52) U.S. Cl. ............................ 475/297; 475/270

(58) Field of Classification Search ............ 475/269, 475/270, 296, 297, 293
See application file for complete search history.

(56) References Cited

U.S. PATENT DOCUMENTS

| 3,021,728 A | 2/1962 | Shimano |
|---|---|---|
| 3,995,503 A | 12/1976 | Schulz |
| 4,147,243 A | 4/1979 | Segawa et al. |
| 4,936,597 A | 6/1990 | Hartmann |
| 5,273,500 A * | 12/1993 | Nagano ............... 475/312 |
| 5,928,103 A * | 7/1999 | Shoge ................. 475/297 |
| 5,971,884 A | 10/1999 | Yoo |
| 6,213,910 B1 * | 4/2001 | Matsuo et al. ....... 475/297 |
| 6,387,008 B1 * | 5/2002 | Chen et al. ........... 475/296 |
| 6,558,288 B2 * | 5/2003 | Okochi ................ 475/297 |
| 2001/0019982 A1 | 9/2001 | Yoo |
| 2002/0170799 A1 | 11/2002 | Miller |

* cited by examiner

*Primary Examiner*—Roger Pang
(74) *Attorney, Agent, or Firm*—Ladas & Parry LLP

(57) ABSTRACT

Disclosed is an automatic speed changing device in which speed is automatically changed according to a predetermined amount of rotation without user's arbitrary manipulations. The automatic speed changing device of the present invention comprises a hub unit including a hub shaft formed with a sun gear, and a hub shell surrounding the sun gear and having a first ratchet ring and an inner gear formed on an inner peripheral surface of the hub shell; a first travel unit including a driver for rotating the hub shell while closing the other side of the hub shell, and a driven sprocket for rotating the driver by receiving power from a driving sprocket; a second travel unit including a first carrier disposed within the hub shell and mounted at one side thereof with a plurality of planetary gears engaged with the sun gear and the inner gear to rapidly rotate the hub shell, and a second carrier extending from the other side of the first carrier to the driver; and a conversion unit including a second ratchet ring interposed between the driver and the second carrier to transmit rotational force from the rotating driver to the second carrier and the planetary gears of the first carrier, and a conversion spring interposed between the first and second carriers to return the second ratchet ring when pedals of a bicycle are not operated and the bicycle is stopped.

8 Claims, 12 Drawing Sheets

AUTOMATIC SPEED CHANGING DEVICE

This is a divisional of application Ser. No. 11/346,995 filed on Feb. 03, 2006 now U.S. Pat. No. 7,351,180, which is a continuation of copending International Application No.: PCT/KR2004/001979 filed on Aug. 6, 2004, which designated the U.S., claims the benefit thereof and incorporates the same by reference.

TECHNICAL FIELD

The present invention relates to an automatic speed changing device, and more particularly, to an automatic speed changing device, wherein speed is automatically changed according to a predetermined amount of rotation without user's arbitrary manipulations.

BACKGROUND ART

Generally, speed changing devices are mounted on bicycles and, in some circumstances, are also mounted on wheelchairs, toy cars using pedals, fishing reels, and the like.

For example, as for recent speed changing devices for bicycles, there have been developed a general speed changing device in which speed changes are achieved by changing the position of a chain for transmitting power between gears of different diameters provided on axes of front and rear wheels of a bicycle, and a speed changing device which is installed within a hub of a rear wheel of a bicycle and in which speed changes are achieved by means of a ratio of teeth of small gears arranged within a hub shell.

However, since the aforementioned devices can complete the speed changes only when users perform predetermined speed changing manipulations to change speed, there are problems in that this causes inconvenience of users and unskillful users may have difficulty in changing speed during travel, leading to safety accidents.

DISCLOSURE OF INVENTION

The present invention is conceived to solve the aforementioned problems in the prior art. An object of the present invention is to provide an automatic speed changing device, wherein speed is automatically changed according to a predetermined amount of rotation without user's arbitrary manipulations.

According to one aspect of the present invention for achieving the object, there is provided an automatic speed changing device, comprising a hub unit including a hub shaft with both ends supported by a frame and with a sun gear formed at the center thereof, and a hub shell surrounding the sun gear and having a first ratchet ring and an inner gear formed on an inner peripheral surface of one side of the hub shell rotatably secured on the hub shaft; a first travel unit including a driver for rotating the hub shell while closing the other side of the hub shell and being rotatably secured on the hub shaft, and a driven sprocket for rotating the driver by receiving power from a driving sprocket; a second travel unit including a first carrier disposed within the hub shell and mounted at one side thereof with a plurality of planetary gears engaged with the sun gear and the inner gear to rapidly rotate the hub shell, and a second carrier extending from the other side of the first carrier to the driver; and a conversion unit including a second ratchet ring interposed between the driver and the second carrier to transmit rotational force from the rotating driver to the second carrier and the planetary gears of the first carrier, and a conversion spring interposed between the first and second carriers to return the second ratchet ring when pedals of a bicycle are not operated and the bicycle is stopped.

According to another aspect of the present invention, there is provided an automatic speed changing device, comprising a hub unit including a hub shaft with both ends supported by a frame and with a sun gear formed at the center thereof, a hub shell surrounding the sun gear and having a first ratchet ring formed on an inner peripheral surface of one side of the hub shell rotatably secured on the hub shaft, and an annular hub driving body detachably mounted on one side of the first ratchet ring and having an inner gear and a second ratchet ring formed integrally on an inner peripheral surface thereof in the vicinity of the first ratchet ring; a first travel unit including a driver for rotating the hub shell while closing the other side of the hub shell and being rotatably secured on the hub shaft, and a driven sprocket for rotating the driver by receiving power from a driving sprocket; a second travel unit including a first carrier disposed within the hub shell and mounted on an outer peripheral surface of one side thereof with third pawls and a plurality of planetary gears respectively engaged with the first ratchet ring, and the sun gear and the inner gear to rapidly rotate the hub shell, and a second carrier extending from the other side of the first carrier to the driver; and a conversion unit including a third ratchet ring interposed between the driver and the second carrier to transmit rotational force from the rotating driver to the second carrier and the third pawls and the planetary gears of the first carrier, and a conversion spring interposed between the first carrier and the third ratchet ring to return the third ratchet ring when pedals of a bicycle are not operated and the bicycle is stopped.

According to a further aspect of the present invention, there is provided an automatic speed changing device, comprising a hub unit including a hub shaft with both ends supported by a frame and with an outer gear at an intermediate portion thereof, and a hub shell surrounding the outer gear and having a third ratchet ring and a second key protrusion formed on an inner peripheral surface of one side of the hub shell rotatably secured on the hub shaft; a first travel unit including a driver rotatably supported by the hub shaft while closing the other side of the hub shell and formed with second pawls on an outer peripheral surface of one side thereof, and a driven sprocket for rotating the driver by receiving power from a driving sprocket; a second travel unit provided within the hub shell, and including, at one side thereof, third pawls for selectively rotating the hub shell while being engaged with the third ratchet ring, and a carrier mounted with a plurality of planetary gears engaged and rotated with the outer gear; and a conversion unit interposed between the first and second travel units, and including a ring gear having an inner gear engaged with the planetary gears at one side thereof and a first key protrusion at the other side thereof, and a bush provided between the first and second key protrusions, thereby selectively transmitting the rotational force from the driver to the carrier or the hub shell.

As described above, in the first and third embodiments of the present invention, speed can be automatically changed according to a predetermined amount of rotation without user's arbitrary manipulations.

BEST MODE FOR CARRYING OUT THE INVENTION

Hereinafter, preferred embodiments of an automatic speed changing device of the present invention will be described with reference to the accompanying drawings.

Figure 1:
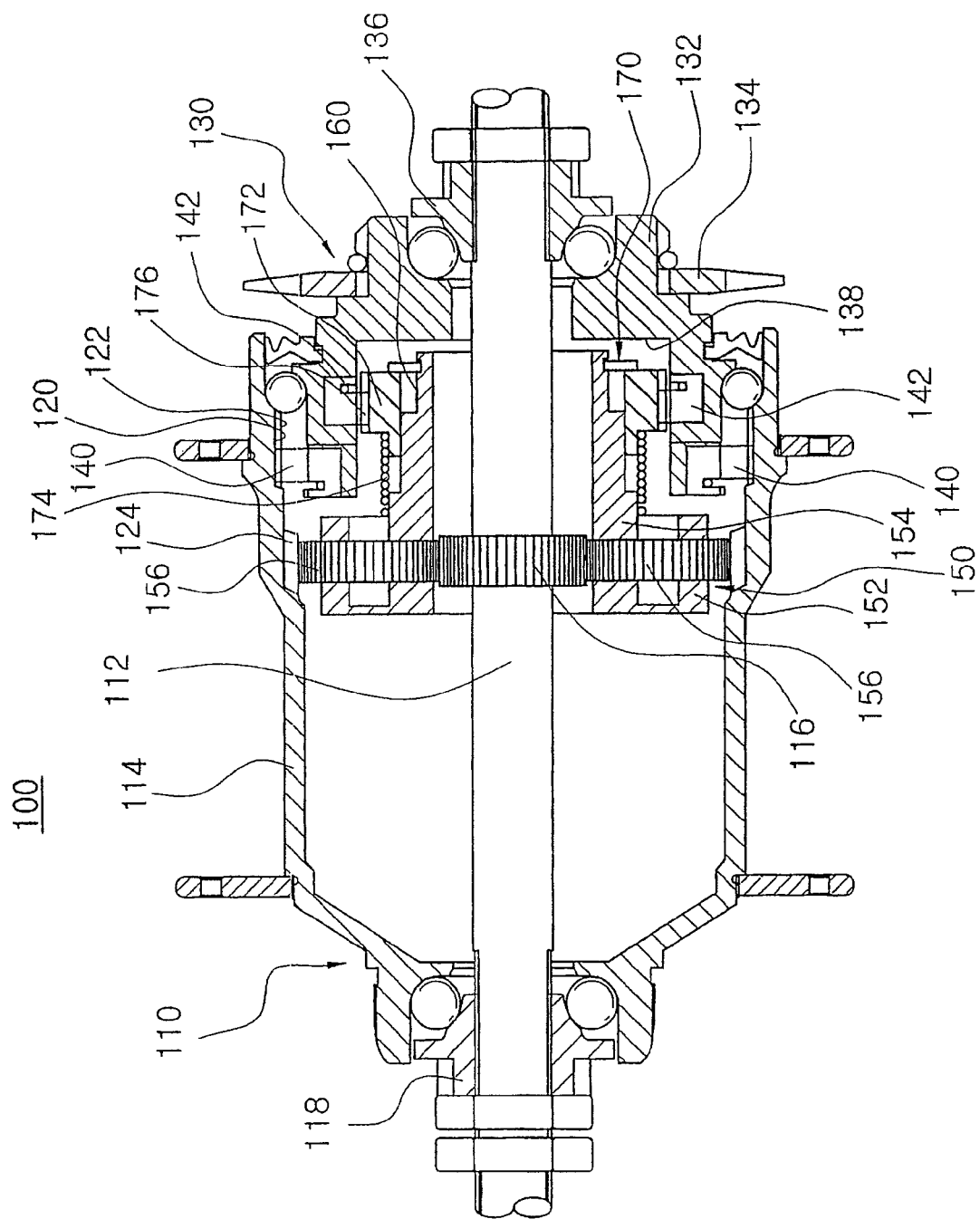
FIG. 1 is a sectional view schematically showing the interior of an automatic speed changing device according to a first embodiment of the present invention.
Figure 2:
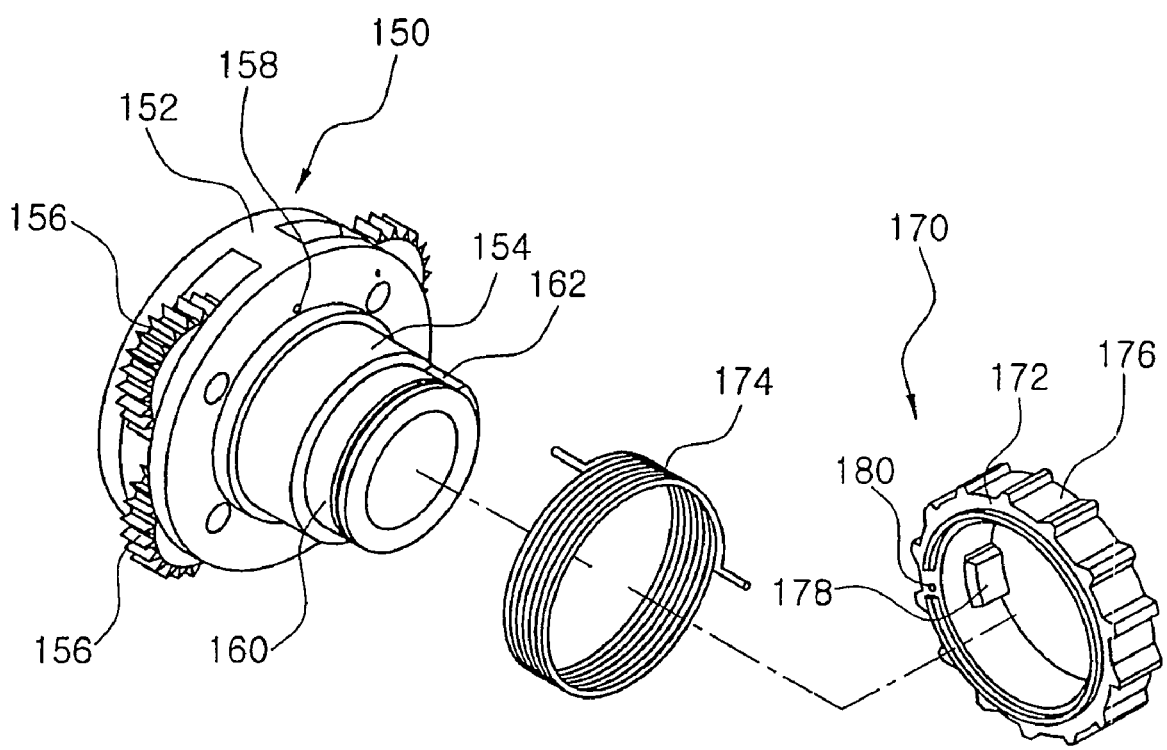
FIG. 2 is an exploded perspective view showing a second travel unit and a conversion unit shown in FIG. 1.

FIG. 1 is a sectional view schematically showing the interior of an automatic speed changing device according to a first embodiment of the present invention, and FIG. 2 is an exploded perspective view showing a second travel unit and a conversion unit shown in FIG. 1.

Referring to FIGS. 1 and 2, the automatic speed changing device 100 according to the first embodiment of the present invention comprises a hub unit 110, a first travel unit 130, the second travel unit 150, and the conversion unit 170.

First, the hub unit 110 comprises a hub shaft 112 and a hub shell 114. The hub shaft 112 has both ends supported by a frame (not shown) and is formed with a sun gear 116 in the middle thereof. The hub shaft 112 with the sun gear 116 formed as such is enclosed with the hub shell 114. The hub shell 114 takes a shape with both open ends. One side of the hub shell 114 is rotatably secured on the hub shaft 112 by means of a first conical nut 118. An inner peripheral surface of the other side of the hub shell 114 is integrally formed with a first ratchet ring 122 that has a plurality of first ratchet recesses 120 radially formed along the inner peripheral surface of the hub shell 114. Inside the first ratchet ring 122, an inner gear 124 is formed radially along the inner peripheral surface of the hub shell 114. The first and second travel units 130 and 150 and the conversion unit 170 are arranged in the hub unit 110 constructed as above.

The first travel unit 130 comprises a driver 132 and a driven sprocket 134. The driver 132 closes the other side of the hub shell 114 while being rotatably secured on the hub shaft 112 by means of a second conical nut 136. At this time, the driven sprocket 134 for receiving power from a driving sprocket (not shown) is mounted on an outer peripheral surface of the other side of the driver 132 which is exposed to the exterior of the hub shell 114. An annular receiving recess 138 is formed inside the driver 132 on a side of the driver 132 extending toward the interior of the hub shell 114. At the same time, a plurality of first pawls 140 selectively coming into close contact with the first ratchet recesses 120 of the first ratchet ring 122 to rotate the hub shell 114 are mounted on an outer peripheral surface of the receiving recess 138, and a plurality of second pawls 142 are mounted on an inner peripheral surface of the receiving recess 138. Preferably, the first and second pawls 140 and 142 resiliently protrude due to snap rings fitted into recesses formed at the centers thereof. When one-way rotational force is transmitted to the first and second pawls 140 and 142, they can transmit the rotational force while maintaining their protruding states. On the contrary, when reverse rotational force is transmitted thereto, the first and second pawls 140 and 142 slide at the first and second ratchet recesses 120 and 176, respectively, and resiliently enter recesses formed at outer and inner peripheral surfaces of the driver 132 so that they cannot transmit the rotational force.

The second travel unit 150 comprises a first carrier 152, and a second carrier 154 formed integrally with the first carrier 152. The first carrier 152 is placed within the hub shell 114 while an inner peripheral surface of the first carrier encloses the sun gear 116. An outer peripheral surface of the first carrier 152 is positioned to be close to the inner gear 124. That is, the first carrier 152 takes the shape of a ring. A plurality of planet gears 156 are rotatably arranged in a radial direction on the outer peripheral surface of the first carrier 152. A first spring coupling recess 158 is formed at a position in the other side surface of the first carrier 152 on the other side of the plurality of planetary gears 156. At this time, radially inward portions of the outer peripheral surfaces of the planetary gears 156 are engaged with the sun gear 116, and radially outward portions of the outer peripheral surfaces of the planetary gears 156 are engaged with the inner gear 124. The second carrier 154 extends from the other side surface of the first carrier 152 toward the interior of the receiving recess 138 of the driver 132 while surrounding the hub shaft 112. An annular guide 160 is formed at a distal end of the second carrier 154 to have a diameter smaller than that of the second carrier 154. A first key protrusion 162 radially protrudes from a portion of the guide 160.

Meanwhile, the conversion unit 170 comprises a second ratchet ring 172 and a conversion spring 174. A plurality of second ratchet recesses 176 selectively coming into close contact with the second pawls 142 are formed on an outer peripheral surface of the second ratchet ring 172, and an inner peripheral surface of the second ratchet ring is fitted around an outer peripheral surface of the second carrier 154. At this time, the inner peripheral surface of the second ratchet ring 172 is formed with a second key protrusion 178 that selectively comes into close contact with the first key protrusion 162 while revolving along the guide 160. A second spring coupling recess 180 is formed in one side surface of the second ratchet ring 172 to correspond to the first spring coupling recess 158. Meanwhile, one end of the conversion spring 174 is mounted in the first spring coupling recess 158 and the other end thereof is mounted in the second spring coupling recess 180 so that the conversion spring can surround the second carrier 154. That is, the second pawls 142 of the rotating driver 132 rotate the second ratchet ring 172, and the second key protrusion 178 of the rotating second ratchet ring 172 revolves around the guide 160 and comes into close contact with the first key protrusion 162, thereby rotating the second and first carriers 154 and 152. As a result, the planetary gears 156 rapidly rotate the hub shell 114 formed with the inner gear 124 about the sun gear 116.

The operation of the speed changing device 100 according to the first embodiment of the present invention constructed as above will be briefly described below.

Figure 3A:
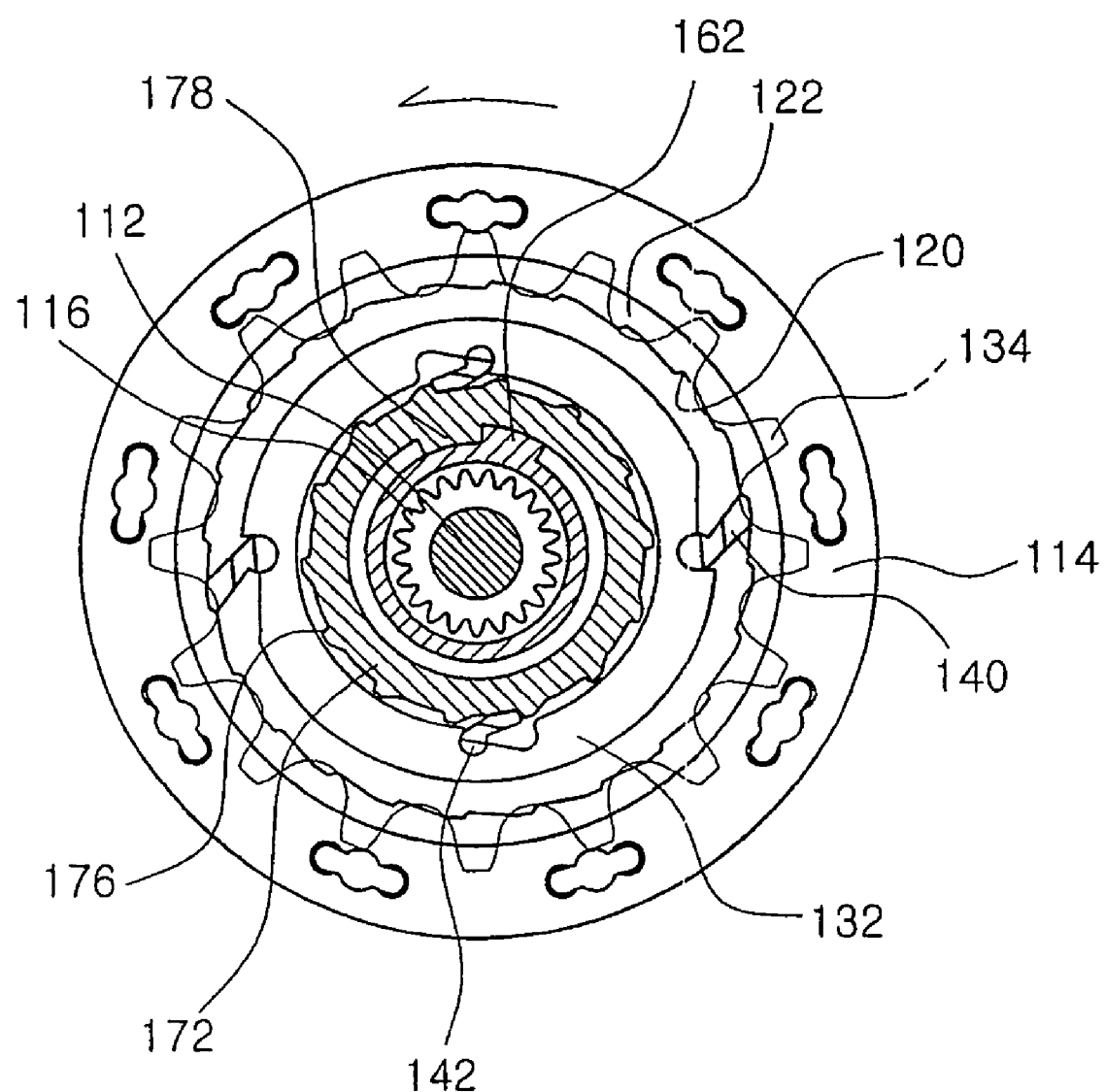
FIG. 3a is a view schematically showing a low-speed travel state of the speed changing device shown in FIG. 1.
Figure 3B:
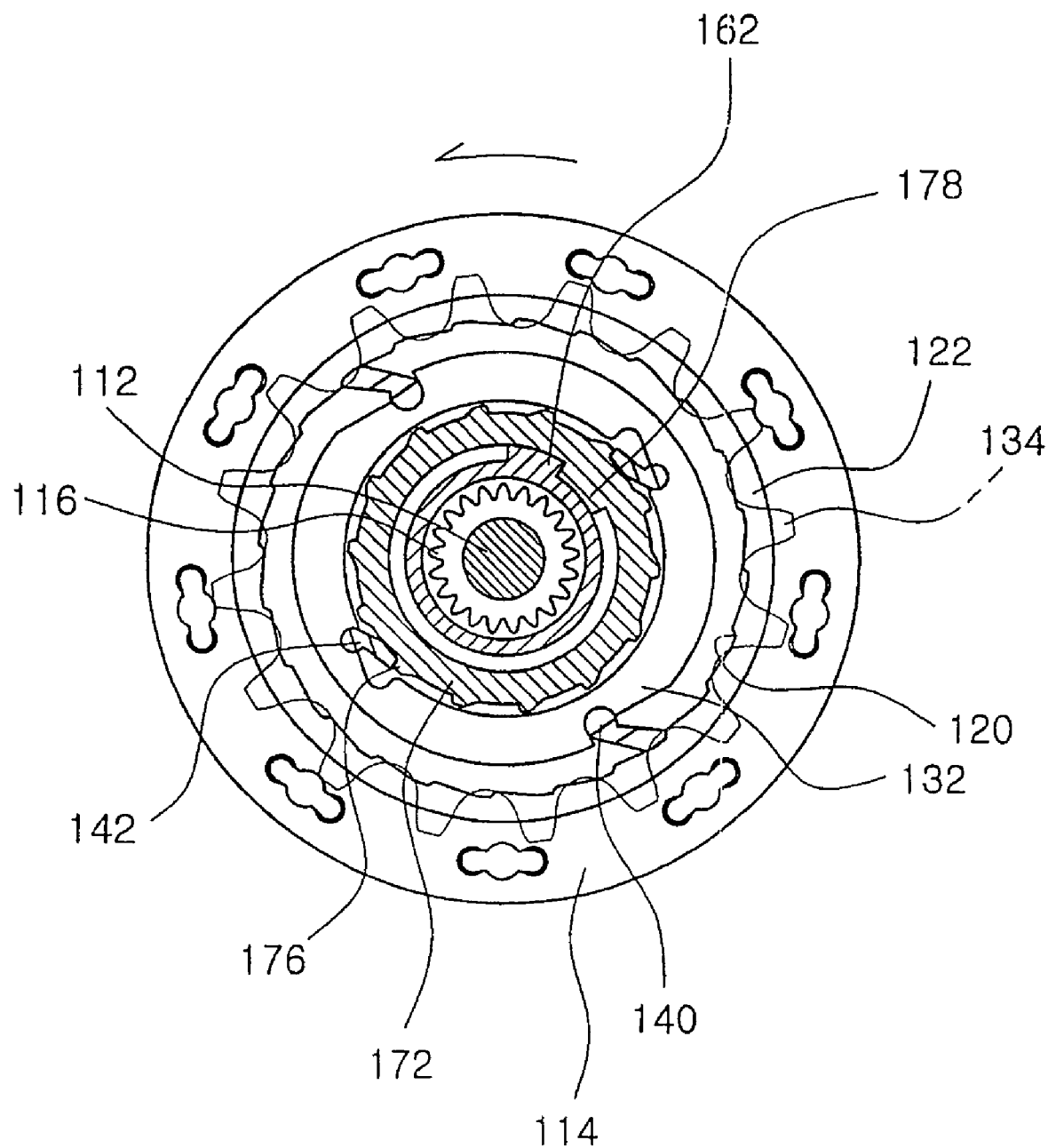
FIG. 3b is a view schematically showing a high-speed travel state of the speed changing device shown in FIG. 1.
Figure 3C:
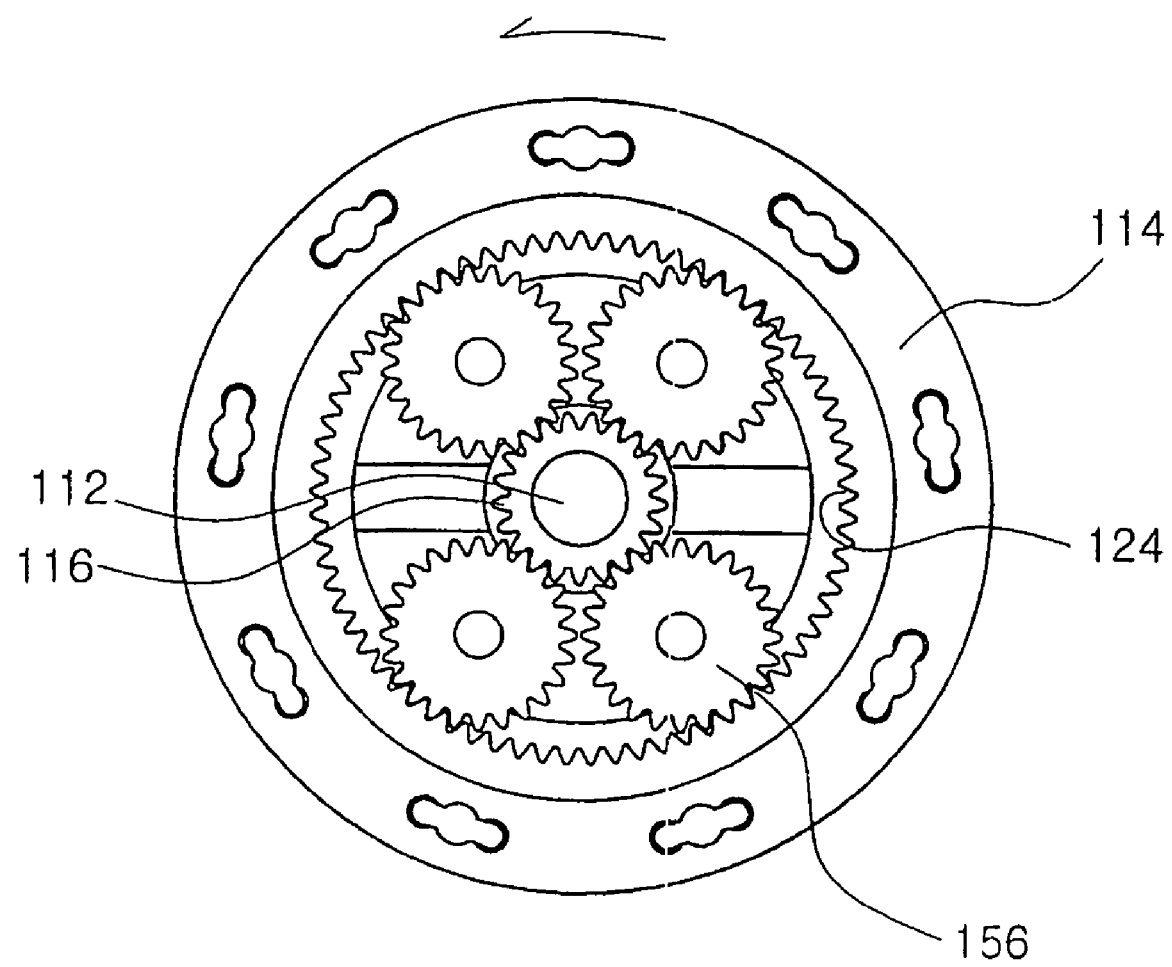
FIG. 3c is a view schematically showing planetary gears and an inner gear of the speed changing device shown in FIG. 1.

FIG. 3a is a view schematically showing a low-speed travel state of the speed changing device shown in FIG. 1, FIG. 3b is a view schematically showing a high-speed travel state of the speed changing device shown in FIG. 1, and FIG. 3c is a view schematically showing the planetary gears and the inner gear of the speed changing device shown in FIG. 1.

Referring to FIGS. 3a to 3c, pedals (not shown) of a bicycle are operated to drive the driving sprocket (not shown) that in turn rotates the driven sprocket 134 and the driver 132 connected thereto through a chain (not shown). When the driver 132 is rotated in such a manner, the first pawls 140 of the driver 132 come into close contact with the first ratchet recesses 120 of the first ratchet ring 122, thereby rotating the hub shell 114. Consequently, the bicycle travels at low speed.

Meanwhile, while the first pawls 140 come into close contact with the first ratchet ring 122, the second pawls 142 come into close contact with the second ratchet recesses 176 of the second ratchet ring 172, thereby rotating the second ratchet ring 172. When the second ratchet ring 172 is rotated in such a manner, the second key protrusion 178 formed on the inner peripheral surface of the second ratchet ring 172 revolves along the guide 160, and the conversion spring 174 is compressed in one direction. At this time, the second key protrusion 178 revolving along the guide 160 rotates counterclockwise and then comes into close contact with the first key protrusion 162 to rotate the second and first carriers 154 and 152. As the first carrier 152 is rotated in such a manner, the planetary gears 156 mounted on the first carrier 152 rapidly rotate the inner gear 124 of the hub shell 114 that is rotating around the sun gear 116. At this time, when the planetary gears 156 rotates the hub shell 114, the first pawls 140 slide at the first ratchet recesses 120.

On the other hand, when the pedals are not operated or the bicycle is stopped, the rotation of the driven sprocket 134 and the driver 132 is stopped. Accordingly, the rotation of the second ratchet ring 172 is also stopped. At this time, the compressed conversion spring 174 is released to rotate the second ratchet ring 172 clockwise. The second ratchet ring 172 stops the high-speed rotation of the second and first carriers 154 and 152.

Figure 4:
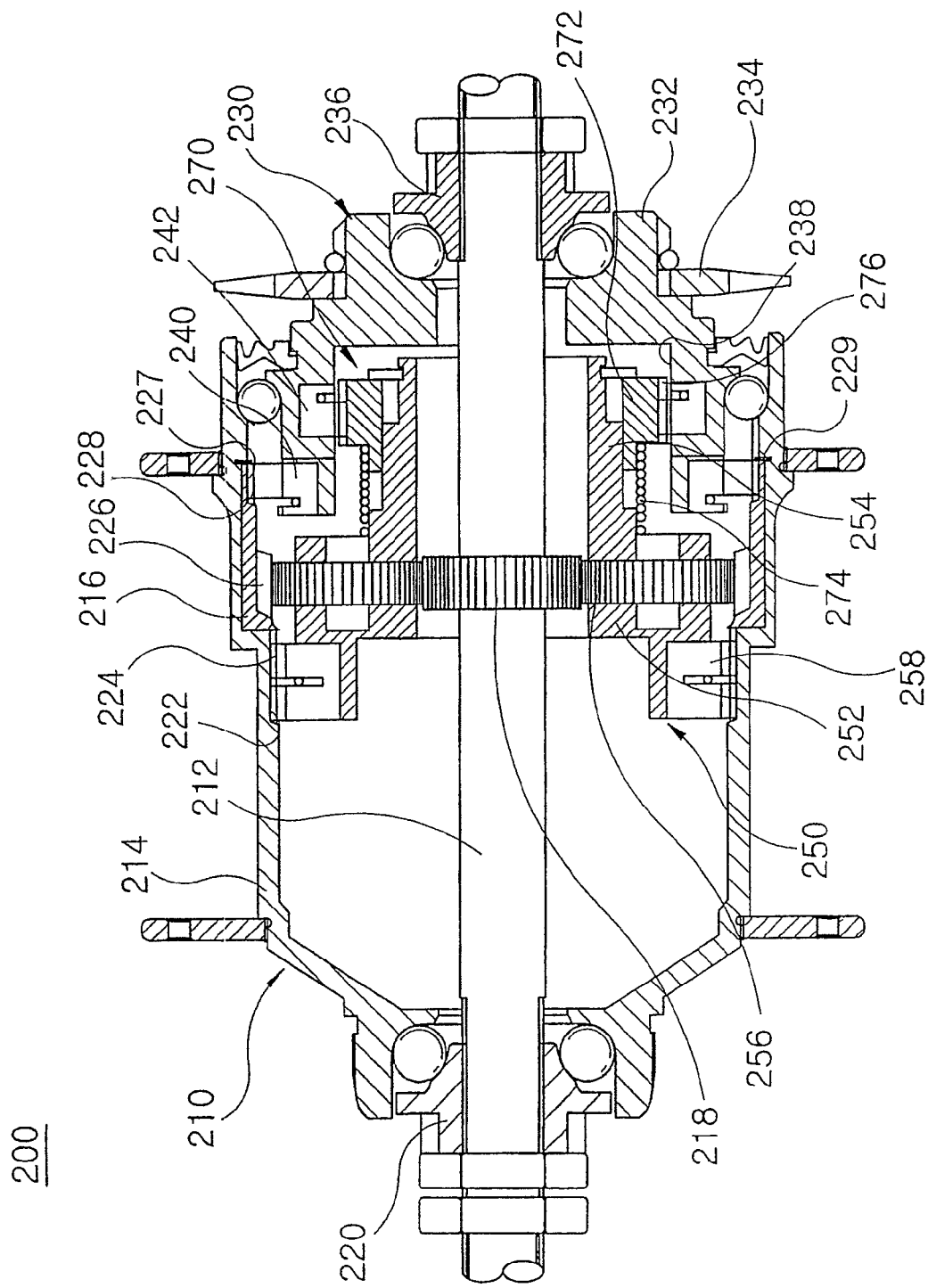
FIG. 4 is a sectional view schematically showing the interior of an automatic speed changing device according to a second embodiment of the present invention.
Figure 5:
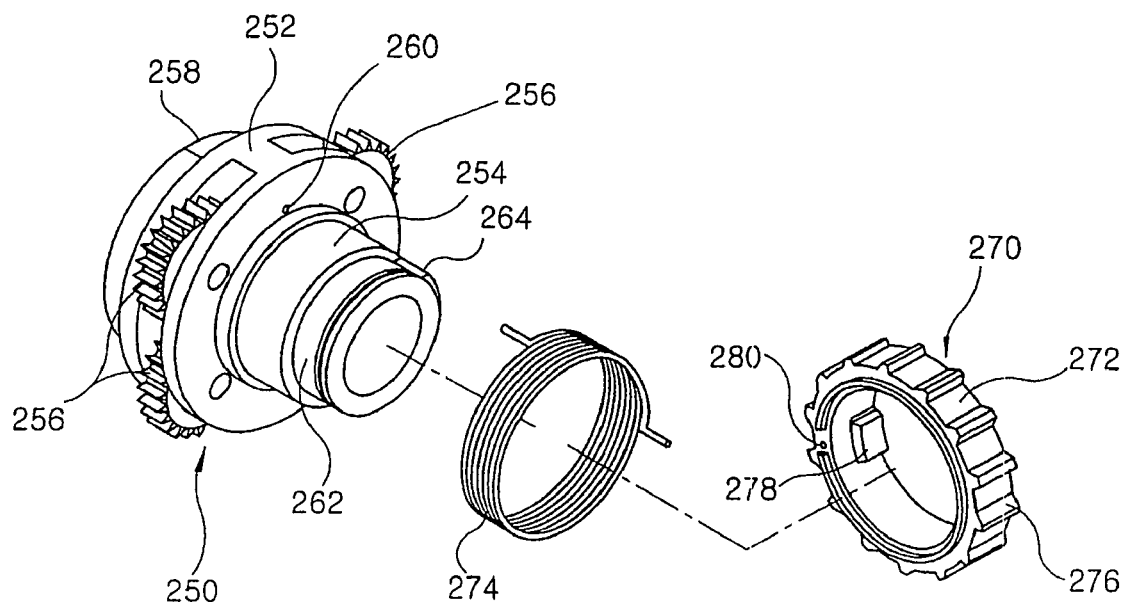
FIG. 5 is an exploded perspective view showing a second travel unit and a conversion unit shown in FIG. 4.

FIG. 4 is a sectional view schematically showing the interior of an automatic speed changing device according to a second embodiment of the present invention, and FIG. 5 is an exploded perspective view showing a second travel unit and a conversion unit shown in FIG. 4.

Referring to FIGS. 4 and 5, the automatic speed changing device 200 according to the second embodiment of the present invention comprises a hub unit 210, a first travel unit 230, the second travel unit 250, and the conversion unit 270.

First, the hub unit 210 comprises a hub shaft 212, a hub shell 214 and a hub driving body 216. The hub shaft 212 has both ends supported by a frame (not shown) and is formed with a sun gear 218 in the middle thereof. The hub shaft 212 with the sun gear 218 formed as such is enclosed with the hub shell 214. The hub shell 214 takes a shape with both open ends. One side of the hub shell 214 is rotatably secured on the hub shaft 212 by means of a first conical nut 220. An inner peripheral surface of the other side of the hub shell is integrally formed with a first ratchet ring 224 that has a plurality of first ratchet recesses 222 radially formed along the inner peripheral surface of the hub shell. Meanwhile, the hub driving body 216 takes the shape of an annular ring and is detachably mounted at one side of the first ratchet ring 224 formed on the inner peripheral surface of the hub shell 214. An inner peripheral surface of the hub driving body 216 is formed with an inner gear 226 to be close to the first ratchet ring 224. A second ratchet ring 228 with a plurality of second ratchet recesses 227 is integrally formed at one side of the inner gear 226. At this time, the hub driving body 216 is fixed to the inner peripheral surface of the hub shell 214 by means of a retaining ring 229. The inner gear 226 and the second ratchet ring 228 are formed to be stepped. The first and second travel units 230 and 250 and the conversion unit 270 are arranged in the hub unit 210 constructed as above.

The first travel unit 230 comprises a driver 232 and a driven sprocket 234. The driver 232 closes the other side of the hub shell 214 while being rotatably secured on the hub shaft 212 by means of a second conical nut 236. At this time, the driven sprocket 124 for receiving power from a driving sprocket (not shown) is mounted on an outer peripheral surface of the other side of the driver 232 which is exposed to the exterior of the hub shell 214. An annular receiving recess 238 is formed inside the driver 232 on a side of the driver 232 extending toward the interior of the hub shell 214. At the same time, a plurality of first pawls 240 selectively coming into close contact with the second ratchet recesses 227 of the second ratchet ring 228 of the hub driving body 216 to rotate the hub shell 214 are mounted on an outer peripheral surface of the receiving recess 238, and a plurality of second pawls 242 are mounted on an inner peripheral surface of the receiving recess 238. Preferably, the first and second pawls 240 and 242 resiliently protrude due to snap rings fitted into recesses formed at the centers thereof. When one-way rotational force is transmitted to the first and second pawls 240 and 242, they can transmit the rotational force while maintaining their protruding states. On the contrary, when reverse rotational force is transmitted thereto, the first and second pawls 240 and 242 slide at the second ratchet recesses 227 and third ratchet recesses 276, respectively, and resiliently enter recesses formed at outer and inner peripheral surfaces of the driver 232 so that they cannot transmit the rotational force.

The second travel unit 250 comprises a first carrier 252, and a second carrier 254 formed integrally with the first carrier 252. The first carrier 252 is placed within the hub shell 214 while an inner peripheral surface of the first carrier encloses the sun gear 218. An outer peripheral surface of the first carrier 252 is positioned to be close to the inner gear 226. That is, the first carrier 252 takes the shape of a ring and is placed on the inner peripheral surface of the hub driving body 216. A plurality of planet gears 256 are rotatably arranged in a radial direction on the outer peripheral surface of the first carrier 252. Third pawls 258 selectively coming into close contact with the first ratchet recesses 222 of the first ratchet ring 224 are formed on the outer peripheral surface of the first carrier 252 on one side of the plurality of planetary gears 256. A first spring coupling recess 260 is formed at a position in the other side surface of the first carrier 252 on the other side of the plurality of planetary gears 258. At this time, radially inward portions of the outer peripheral surfaces of the planetary gears 256 are engaged with the sun gear 218, and radially outward portions of the outer peripheral surfaces of the planetary gears 256 are engaged with the inner gear 226 of the hub driving body 216. The second carrier 254 extends from the other side surface of the first carrier 252 toward the interior of the receiving recess 238 of the driver 232 while surrounding the hub shaft 212. An annular guide 262 is formed at a distal end of the second carrier 254 to have a diameter smaller than that of the second carrier 254. A first key protrusion 264 radially protrudes from a portion of the guide 262.

Meanwhile, the conversion unit 270 comprises a third ratchet ring 272 and a conversion spring 274. The plurality of third ratchet recesses 276 selectively coming into close contact with the third pawls 242 are formed on an outer peripheral surface of the third ratchet ring 272, and an inner peripheral surface of the third ratchet ring is fitted around an outer peripheral surface of the second carrier 254. At this time, the inner peripheral surface of the third ratchet ring 276 is formed with a second key protrusion 278 that selectively comes into close contact with the first key protrusion 264 while revolving along the guide 262. A second spring coupling recess 280 is formed in one side surface of the third ratchet ring 272 to correspond to the first spring coupling recess 260. Meanwhile, one end of the conversion spring 274 is mounted in the first spring coupling recess 260 and the other end thereof is mounted in the second spring coupling recess 280 so that the conversion spring can surround the second carrier 254. That is, the second pawls 242 of the rotating driver 232 rotate the third ratchet ring 272, and the second key protrusion 278 of the rotating third ratchet ring 272 revolves around the guide 262 and comes into close contact with the first key protrusion 264, thereby rotating the second and first carriers 254 and 252. As a result, the planetary gears 256 are engaged with the inner gear 226 about the sun gear 218, and the third pawls 258 are engaged with the first ratchet ring 224, thereby rapidly rotating the hub shell 214.

The operation of the speed changing device 200 according to the second embodiment of the present invention constructed as above will be briefly described below.

Pedals (not shown) of a bicycle are operated to drive the driving sprocket (not shown) that in turn rotates the driven sprocket 234 and the driver 232 connected thereto through a chain (not shown). When the driver 232 is rotated in such a manner, the first pawls 240 of the driver 232 come into close contact with the second ratchet recesses 227 of the second ratchet ring 228, thereby rotating the hub driving body 216 on the inner peripheral surface of the hub shell 214. Accordingly, the inner gear 226 formed integrally with the hub driving body 216 is rotated while being engaged with the outer peripheral surfaces of the planetary gears 256 of the first carrier 252, thereby rotting the first carrier 252. Thereafter, the third pawls 258 provided at the first carrier 252 rotate the hub shell 214. Consequently, the bicycle travels at low speed.

Meanwhile, while the first pawls 240 come into close contact with the second ratchet ring 228, the second pawls 242 come into close contact with the third ratchet recesses 276 of the third ratchet ring 272, thereby rotating the third ratchet ring 272. When the third ratchet ring 272 is rotated in such a manner, the second key protrusion 278 formed on the inner peripheral surface of the third ratchet ring 272 revolves along the guide 262, and the conversion spring 274 is compressed in one direction. At this time, the second key protrusion 278 revolving along the guide 262 rotates counterclockwise and then comes into close contact with the first key protrusion 264 to rotate the second and first carriers 254 and 252. As the first carrier 252 is rotated in such a manner, the third pawls 258 provided at the first carrier 252 rotate the hub shell 214 more rapidly. At this time, the first pawls 240 slide at the second ratchet recesses 227.

On the other hand, when the pedals are not operated or the bicycle is stopped, the rotation of the driven sprocket 234 and the driver 232 is stopped. Accordingly, the rotation of the third ratchet ring 272 is also stopped. At this time, the compressed conversion spring 274 is released to rotate the third ratchet ring 272 clockwise. The third ratchet ring 272 stops the high-speed rotation of the second and first carriers 254 and 252.

Figure 6:
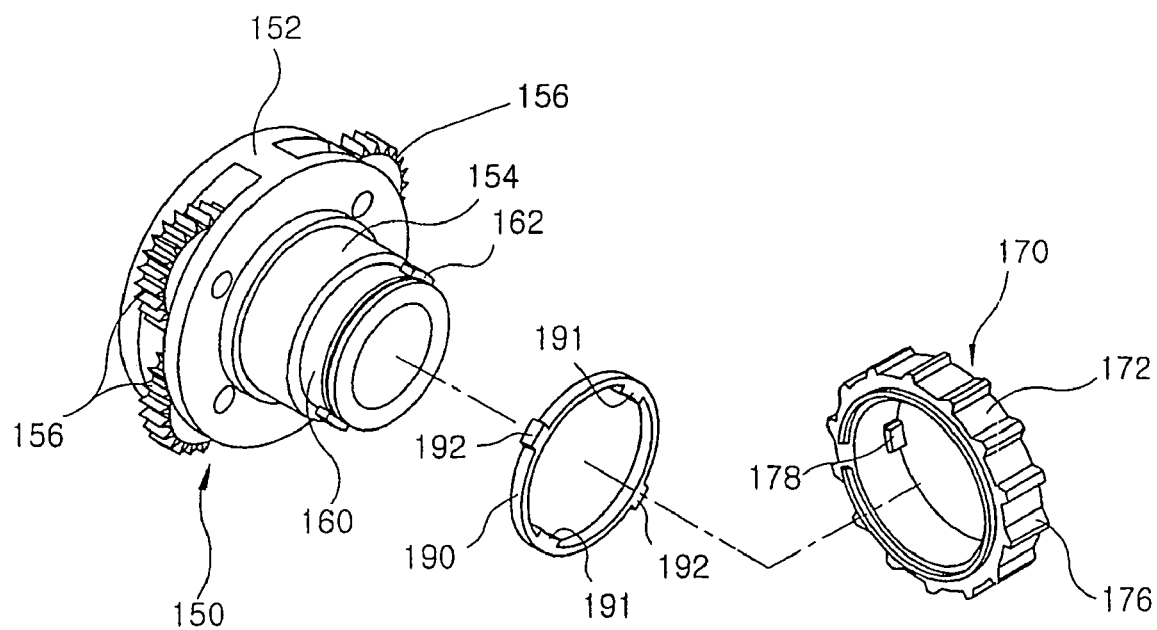
FIG. 6 is an exploded perspective view showing another example of the second travel unit and the conversion unit of the automatic speed changing device of the present invention.

In the first and second embodiments of the present invention described above, the first spring coupling recesses 158 and 260 and the second spring coupling recesses 180 and 280 for supporting the conversion springs 174 and 274 may be excluded as shown in FIG. 6.

Here, FIG. 6 is an exploded perspective view showing another example of the second travel unit and the conversion unit of the automatic speed changing device according to the first embodiment of the present invention.

In the first embodiment, when the second ratchet ring 172 which has been rotated by the driven sprocket 134 and the driver 132 is stopped, the second carrier 154 is not immediately stopped but rotates due to inertial force without the conversion spring 174 for returning the second ratchet ring 172 to the initial position. Therefore, it is possible to obtain the same effects as the conversion into the low-speed travel state through the return to the initial state where the second ratchet ring 172 beings to be driven.

However, in the second embodiment, when the third ratchet ring 272 which has been rotated by the driven sprocket 234 and the driver 232 is stopped, the high-speed travel state is continuously maintained in the absence of the conversion spring 274 for returning the third ratchet ring 272 to the initial position. Only when the rotation of the hub shell 214 is finally stopped, it is possible to obtain the same effects as the conversion into the low-speed travel state through the return to the initial state where the third ratchet ring 272 begins to be driven.

Figure 7A:
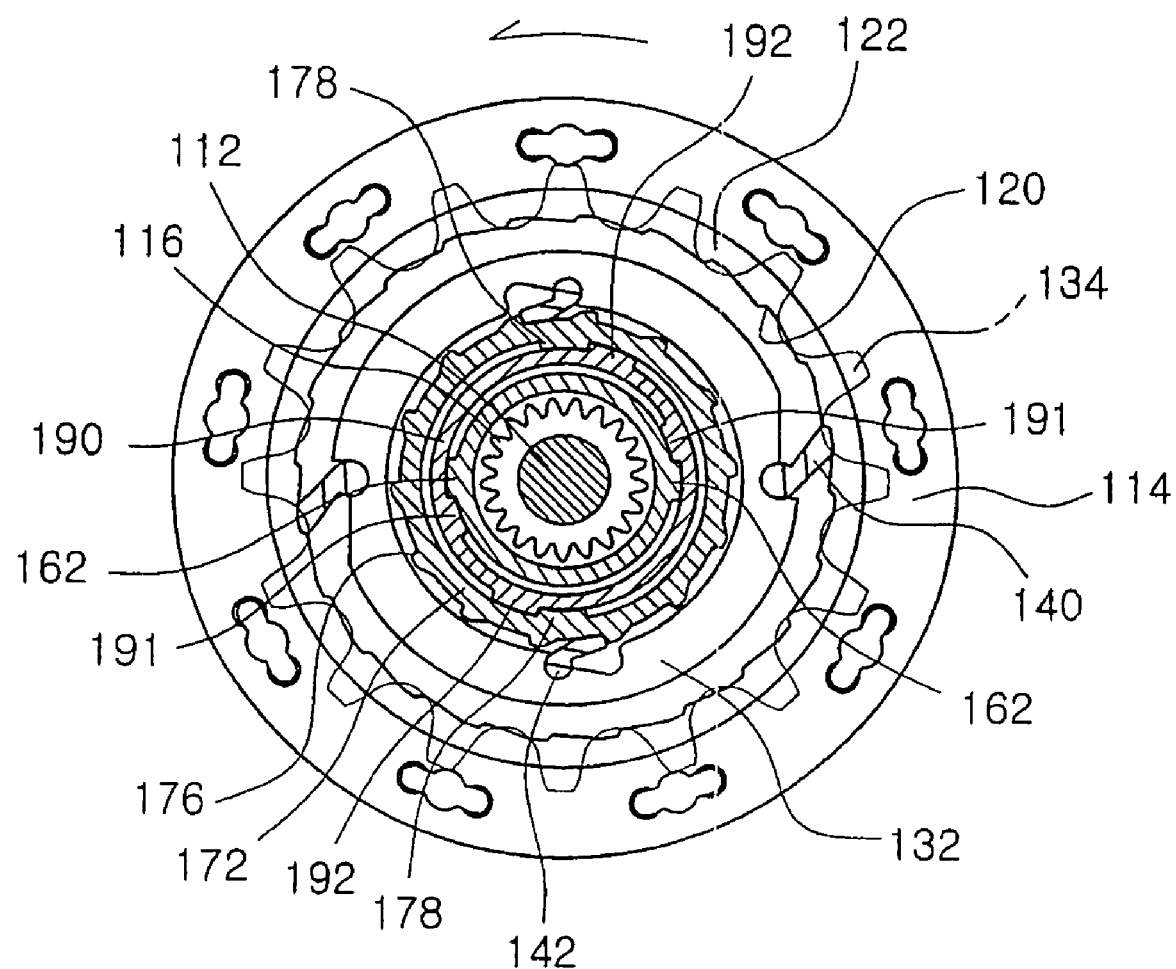
FIGS. 7a and 7b are views schematically showing another example of the low- and high-speed travel states of the automatic speed changing device of the present invention.
Figure 7B:
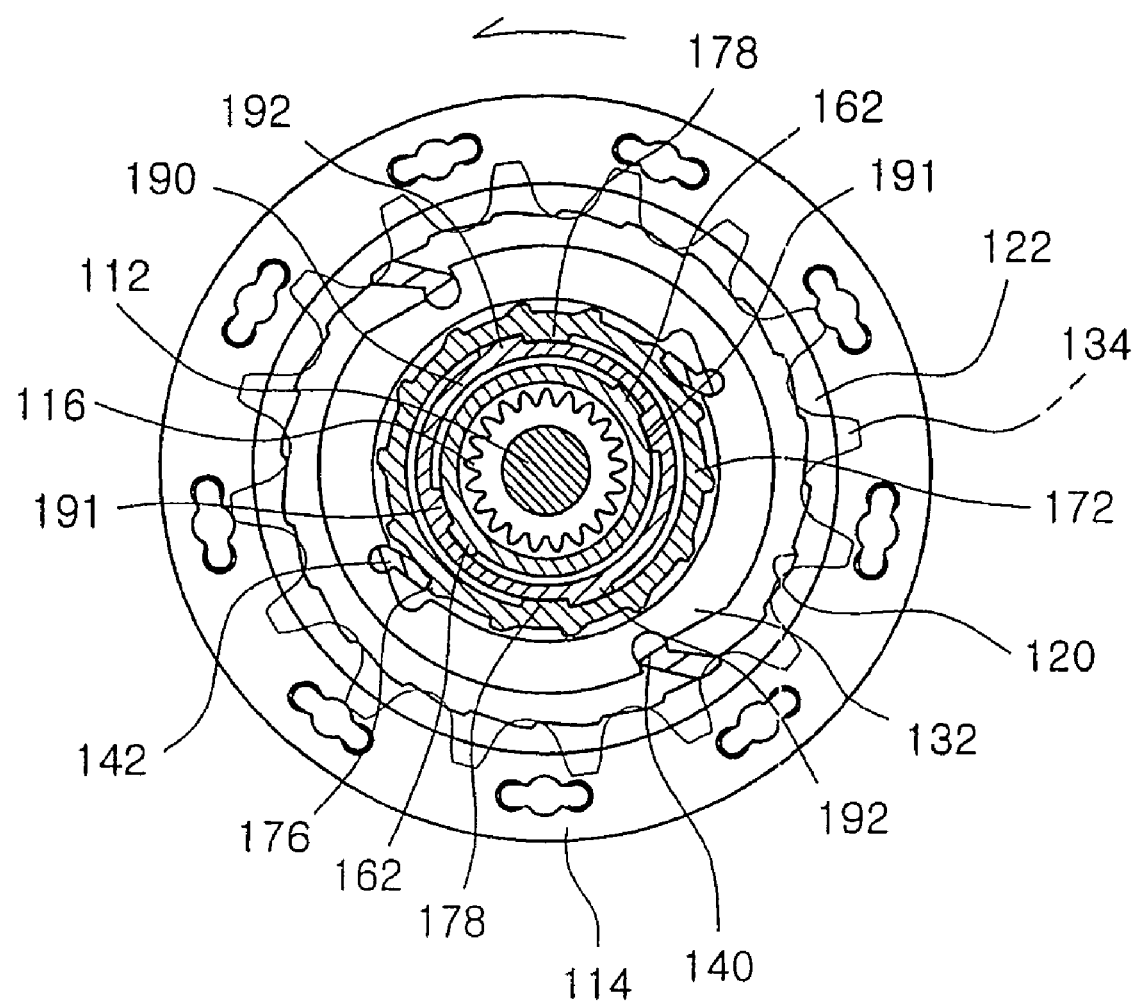

FIGS. 7a and 7b are views schematically showing another example of the low- and high-speed travel states of the automatic speed changing device of the present invention.

In the first embodiment of the present invention, as shown in FIGS. 6, 7a and 7b, two or more first key protrusions 162 may be formed equidistantly on the outer peripheral surface of the second carrier 154, and two or more second key protrusions 178 may be formed equidistantly on the inner peripheral surface of the second ratchet ring 172. An annular bush 190 may be further provided between the outer peripheral surface of the second carrier 154 and the inner peripheral surface of the second ratchet ring 172. The bush 190 has inner key protrusions 191 corresponding to the first key protrusions 162 and outer key protrusions 192 corresponding to the second key protrusions 178, which are formed equidistantly on an inner peripheral surface and an outer peripheral surface of the bush, respectively.

That is, in case of the low-speed travel state, the hub shell 114 is rotated by the plurality of first pawls 140. On the contrary, in case of the high-speed travel state, the rotational force is transmitted only by the single second key protrusion 178 formed at the second ratchet ring 172 and the single first key protrusion 162 formed at the second carrier 154 as shown in FIG. 3b. Thus, since large rotational force is exerted on the first and second key protrusions 162 and 178, the first and second key protrusions 162 and 178 are easily damaged.

If two or more first and second key protrusions 162 and 178 are simply formed at the second carrier 154 and the second ratchet ring 172 in order to prevent such a phenomenon, speed changing timing is shortened to below about the half of that obtained in the case where the single first key protrusion 162 and the single second key protrusion 178 are formed.

Figure 8:
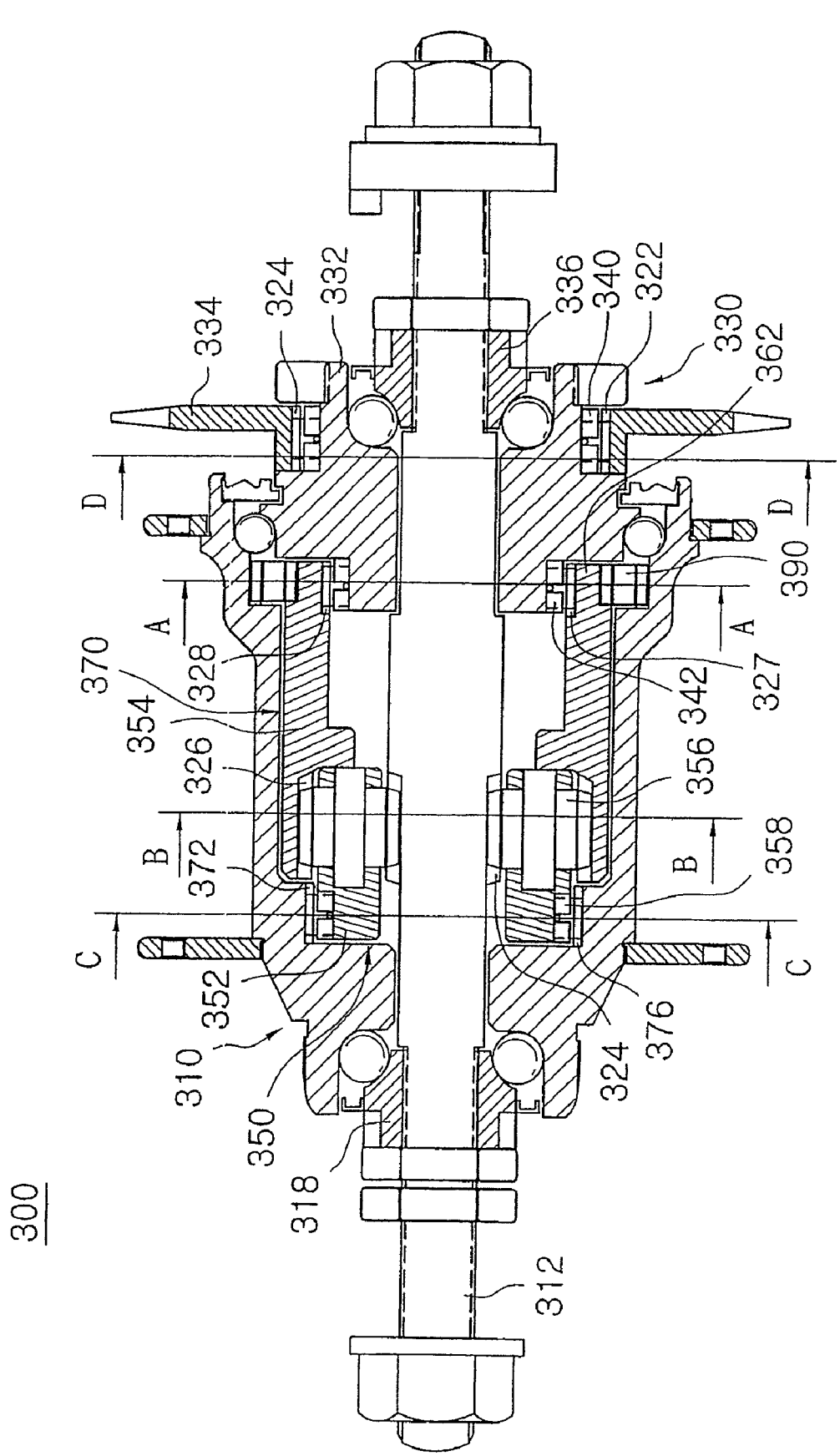
FIG. 8 is a sectional view schematically showing the interior of an automatic speed changing device according to a third embodiment of the present invention.
Figure 9:
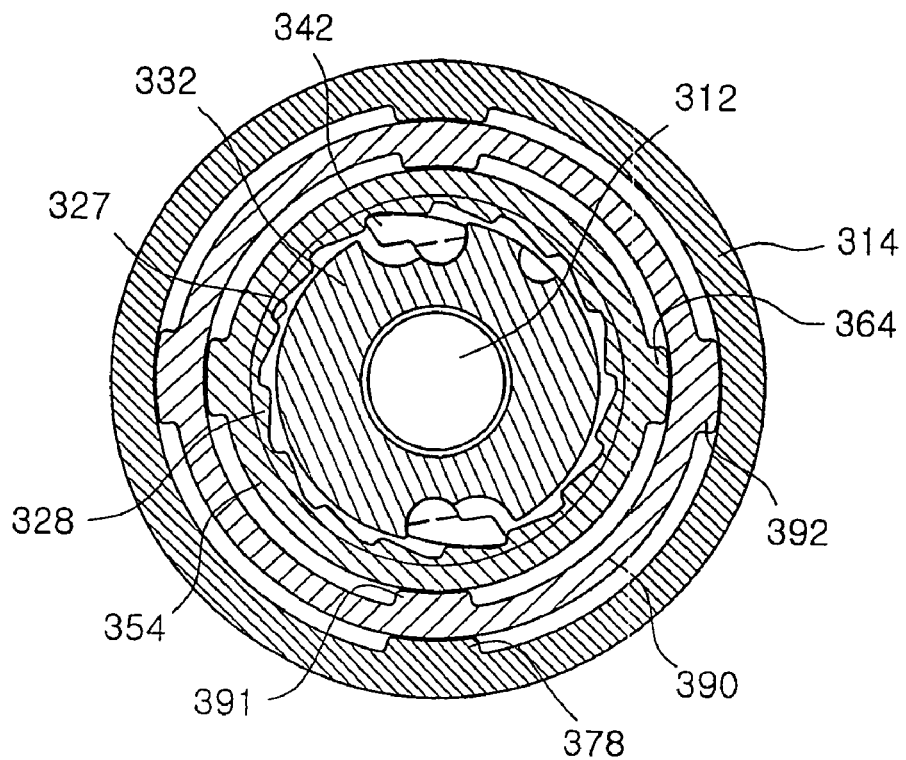
FIG. 9 is a sectional view taken along line A-A in FIG. 8.
Figure 10:
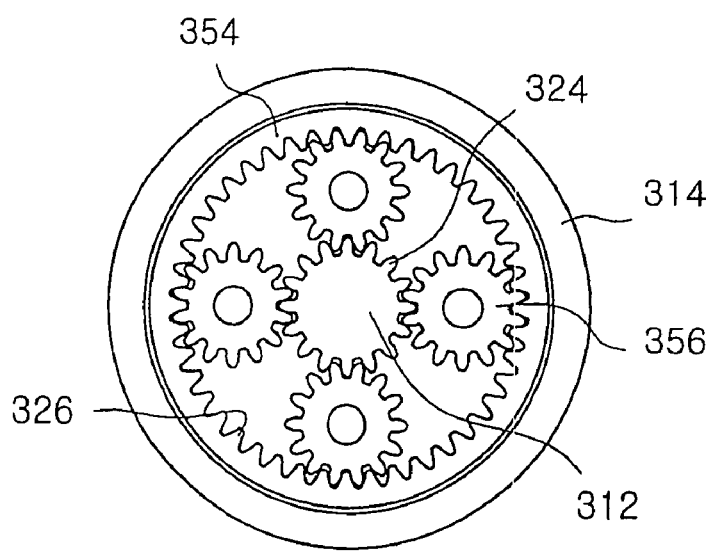
FIG. 10 is a sectional view taken along line B-B in FIG. 8.

To overcome this, as shown in FIGS. 8 to 10, the bush 190, which has the two inner key protrusions 191 on the inner peripheral surface to correspond to the first key protrusions 162 and the two outer key protrusions 192 on the outer peripheral surface to correspond to the second key protrusions 178, is further provided between the outer peripheral surface of the second carrier 154 and the inner peripheral surface of the second ratchet ring 172, so that the rotational force is distributed and then transmitted by the two or more first and second key protrusions 162 and 178. Thus, damage to the first and second key protrusions 162 and 178 can be prevented in advance.

In addition, it is possible to obtain an excellent advantage in that speed changing timing from the low-speed travel state to the high-speed travel-state (i.e., the time when the second carrier begins to be rotated by the second ratchet ring) can be easily controlled by properly adjusting the intervals and numbers of the inner and outer key protrusions 191 and 192 formed at the bush 190.

Similarly, even in the second embodiment of the present invention, two or more first key protrusions 264 may be formed equidistantly on the outer peripheral surface of the second carrier 254, and two or more second key protrusions 278 may be formed equidistantly on the inner peripheral surface of the third ratchet ring 272. An annular bush 190 may be further provided between the outer peripheral surface of the second carrier 254 and the inner peripheral surface of the third ratchet ring 272. The bush 190 has inner key protrusions 191 corresponding to the first key protrusions 264 and outer key protrusions 192 corresponding to the second key protrusions 278, which are formed equidistantly on an inner peripheral surface and an outer peripheral surface of the bush, respectively. Accordingly, it is possible to obtain the same effects as the first embodiment described above.

Figure 11:
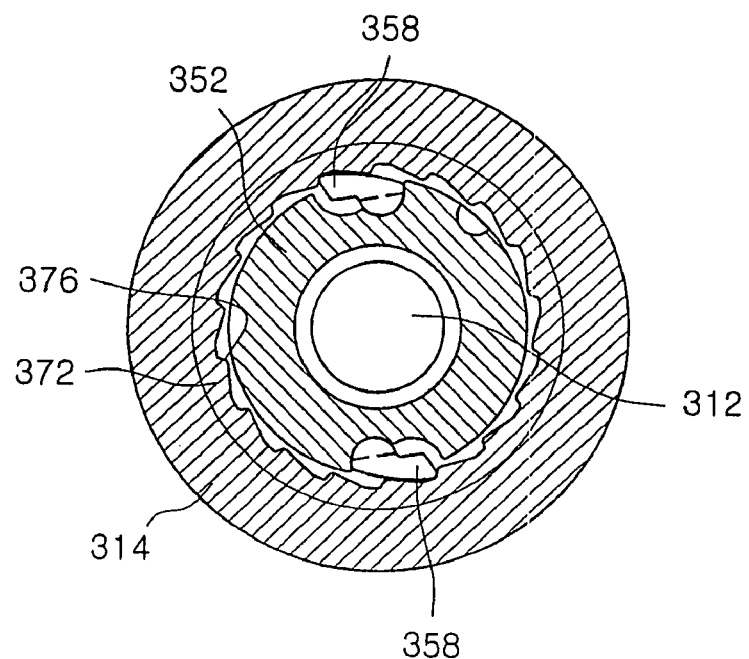
FIG. 11 is a sectional view taken along line C-C in FIG. 8.
Figure 12:
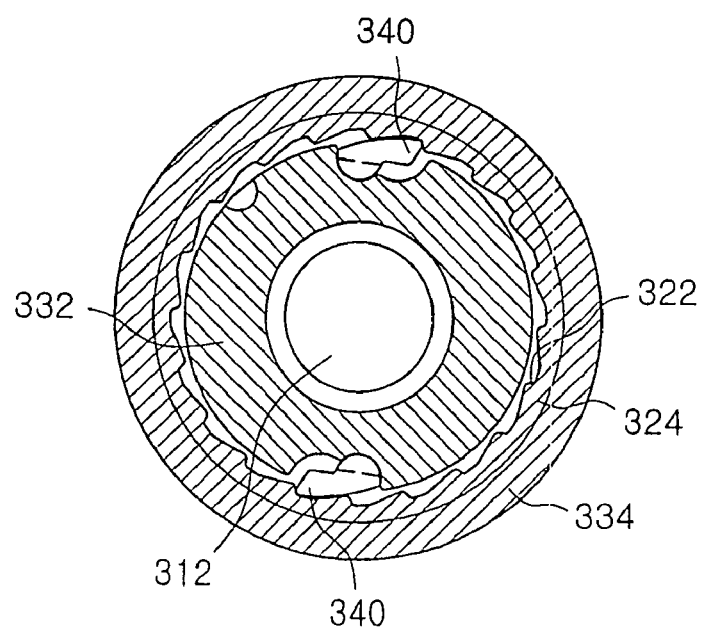
FIG. 12 is a sectional view taken along line D-D in FIG. 8.

FIG. 8 is a sectional view schematically showing the interior of an automatic speed changing device according to a third embodiment of the present invention, FIG. 9 is a sectional view taken along line A-A in FIG. 8, and FIG. 10 is a sectional view taken along line B-B in FIG. 8. Further, FIG. 11 is a sectional view taken along line C-C in FIG. 8, and FIG. 12 is a sectional view taken along line D-D in FIG. 8.

Referring to FIGS. 8 to 12, the automatic speed changing device 300 according to the third embodiment of the present invention comprises a hub unit 310, a first travel unit 330, a second travel unit 350, and a conversion unit 370.

First, the hub unit 310 comprises a hub shaft 312 and a hub shell 314. The hub shaft 312 has both ends supported by a frame (not shown) and is formed with an outer gear 324 in an intermediate portion thereof. The hub shaft 312 with the outer gear 324 formed as such is enclosed with the hub shell 314. The hub shell 314 takes a shape with both open ends. One side of the hub shell 314 is rotatably secured on the hub shaft 312 by means of a first conical nut 318. An inner peripheral surface of an intermediate portion of the hub shell 314 is integrally formed with a third ratchet ring 372 that has a plurality of third ratchet recesses 376 radially formed along the inner peripheral surface of the hub shell 314. An inner peripheral surface of the other side of the hub shell 314 is formed with two or more second key protrusions 378 radially along the inner peripheral surface of the hub shell 314. The first and second travel units 330 and 350 and the conversion unit 370 are arranged in the hub unit 310 constructed as above.

The first travel unit 330 comprises a driver 332 and a driven sprocket 334. The driver 332 closes the other side of the hub shell 314 while being rotatably secured on the hub shaft 312 by means of a second conical nut 336. At this time, the driven sprocket 334 for receiving power from a driving sprocket (not shown) is mounted on an outer peripheral surface of the other side of the driver 332 which is exposed to the exterior of the hub shell 314. A plurality of second pawls 342 selectively coming into close contact with second ratchet recesses 327 of a second ratchet ring 328 to rotate a ring gear 354 are mounted on an outer peripheral surface of the driver 332 extending into the hub shell 314. At this time, an inner peripheral surface of the driven sprocket 334 is integrally formed with a first ratchet ring 324 having a plurality of first ratchet recesses 322 formed along the inner peripheral surface. A plurality of first pawls 340 selectively coming into close contact with the first ratchet recesses 322 of the first ratchet ring 324 to rotate the driver 332 are mounted on an outer peripheral surface of the driver 332 extending to the exterior of the hub shell 314. Preferably, the first and second pawls 340 and 342 resiliently protrude beyond the outer peripheral surface of the driver 332 due to snap rings fitted into recesses formed at the centers thereof. When one-way rotational force is transmitted to the first and second pawls 340 and 342, the first pawls 340 and the second pawls 342 can transmit the rotational force to the driver 332 and the ring gear 354, respectively, while maintaining their protruding states. On the contrary, when reverse rotational force is transmitted thereto, the first or second pawls 340 or 342 slide at the first or second ratchet recesses 322 or 327, respectively, and resiliently enter recesses formed at the outer peripheral surface of the driver 332 so that they cannot transmit the rotational force.

The second travel unit 350 comprises an annular carrier 352 provided with a plurality of third pawls 358 and planetary gears 356. The carrier 352 is placed within the hub shell 314 while an inner peripheral surface of the carrier encloses the outer gear 324. An outer peripheral surface, of the carrier 352 is positioned to be close to an inner gear 326. The plurality of third pawls 358 selectively coming into close contact with the third ratchet recesses 376 of the third ratchet ring 372 to rotate the hub shell 314 are formed on an outer peripheral surface of one side of the carrier 352. The plurality of planetary gears 356 are rotatably arranged in a radial direction on an outer peripheral surface of the other side of the carrier 352, so that radially inward portions of the outer peripheral surfaces of the planetary gears 356 are engaged with the outer gear 324, and radially outward portions of the outer peripheral surfaces of the planetary gears 356 are engaged with the inner gear 326. At this time, the third pawls 358 also resiliently protrude beyond the outer peripheral surface of the carrier 352 due to snap rings fitted into recesses formed at the centers thereof. When one-way rotational force is transmitted to the third pawls 358, they can transmit the rotational force to the hub shell 314 while maintaining their protruding states. On the contrary, when reverse rotational force is transmitted thereto, the third pawls 358 slide at the third ratchet recesses 376 and resiliently enter recesses formed at the outer peripheral surface of the carrier 352 so that they cannot transmit the rotational force.

Meanwhile, the conversion unit 370 comprises the ring gear 354 and a bush 390 and is interposed between the first and second travel units 330 and 350. The inner gear 326 engaged with the planetary gears 356 is formed on an inner peripheral surface of one side of the ring gear 354, and the second ratchet ring 328 formed with the plurality of second ratchet recesses 327 selectively coming into close contact with the second pawls 342 is integrally formed on an inner peripheral surface of the other side of the ring gear 354. Two or more first key protrusions 364 are formed equidistantly on an outer peripheral surface of the other side of the ring gear 354, and the bush 390 is fitted between the first and second key protrusions 364 and 378. At this time, the bush 390 has inner key protrusions 391 corresponding to the first key protrusions 364 and outer key protrusions 392 corresponding to the second key protrusion 378, which are formed equidistantly on an inner peripheral surface and an outer peripheral surface of the bush, respectively. As the first key protrusions 364 are rotated together with the ring gear 354, the first key protrusions 364 rotates the inner key protrusions 391 of the bush 390, resulting in a predetermined amount of rotation. Thereafter, the outer key protrusions 392 of the bush 390 rotate the second key protrusions 378. As a result, the hub shell 314 is rotated at high speed.

The operation of the speed changing device 300 according to the third embodiment of the present invention constructed as above will be briefly described below.

Referring to FIGS. 8 to 12, pedals (not shown) of a bicycle are operated to drive the driving sprocket (not shown) that in turn rotates the driven sprocket 334 connected thereto through a chain (not shown). The first pawls 340 of the driver 332 come into close contact with the first ratchet recesses 322 formed at the first ratchet ring 324 of the driven sprocket 334, thereby rotating the driver 332. If reverse rotational force is transmitted to the driven sprocket 334 in such a state, the first pawls 340 slide at the first ratchet recesses 322 so that the reverse rotational force cannot be transmitted to the driver. When the driver 322 is rotated in such a manner, the second pawls 342 of the driver 332 come into close contact with the second ratchet recesses 327 of the second ratchet ring 328, thereby rotating the ring gear 354. Accordingly, the inner gear 326 of the ring gear 354 rotates the planetary gears 356 engaged with the outer gear 324 so that the carrier 352 is rotated about the hub shaft 312. The third pawls 358 provided at the carrier 352 come into close contact with the third ratchet recesses 376 formed at the third ratchet ring 372 of the hub shell 314, thereby rotating the hub shell 314. Consequently, the bicycle travels at low speed.

Meanwhile, as the ring gear 354 is rotated, the planetary gears 356 are rotated, and at the same time, the first key protrusions 364 formed at the ring gear 354 revolve unitarily. Accordingly, after the first key protrusions 364 revolve through a predetermined angle, they come into contact with the inner key protrusions 391 of the bush 390, thereby rotating the bush 390. After the first key protrusions 364 further continue to revolve through a predetermined angle together with the bush 390, the outer key protrusions 378 of the bush 390 come into contact with the second key protrusions 378 of the hub shell 314, thereby rapidly rotating the hub shell 314. At this time, if the ring gear 354 rotates the hub shell 314 at high speed, the third pawls 358 slide at the third ratchet recesses 376.

On the contrary, when the pedals are not operated, the rotation of the driven sprocket 334 and the driver 332 is stopped, whereas the hub shell 314 continues to rotate until the bicycle is stopped. Therefore, the bush 390 interposed between the first and second key protrusions 364 and 378 returns to the low-speed travel state that is a state prior to an initial driving state.

At this time, by properly adjusting the intervals and numbers of the inner and outer key protrusions 391 and 392 formed at the bush 390, it is possible to obtain excellent advantages in that large rotational force is prevented from being locally exerted on the first and second key protrusions 364 and 378 to prevent the occurrence of damage to parts, and that speed changing timing from the low-speed travel state to the high-speed travel state (i.e., the time when the hub shell begins to be rotated at high speed by the ring gear) can be easily controlled.

Although the first to third embodiments of the present invention have been described in connection with a bicycle, they can also be easily applied to general machines, including wheelchairs, toy cars using pedals and fishing reels, or industrial machines as well as gas valves, locks and the like in which speed is changed.

Therefore, the automatic speed changing device of the present invention can positively change speed using mechanical elements, such as a sun gear and planetary gears, and pawls and ratchets, according to a predetermined amount of rotation without additional manipulations. Since the speed changing timing can be easily controlled according to the numbers and positions of key protrusions formed at a bush, the automatic speed changing device of the present invention can be widely applied to and conveniently used in the whole field of power transmission mechanisms.

As described above, the automatic speed changing devices according to the first to third embodiments of the present invention allow speed to be automatically changed during travel of a bicycle rather than conventional speed changing through manipulation of a lever. Therefore, there are advantages in that convenience of users can be maximized, and production costs can be reduced and maintenance thereof can be easily performed due to the simple structure thereof.

Although the present invention has been described in connection with the preferred embodiments of the present invention, it will be readily understood by those skilled in the art that various modifications and changes can be made thereto without departing from the spirit and scope of the present invention defined by the appended claims.

The invention claimed is:

1. An automatic speed changing device, comprising:
a hub unit including a hub shaft with both ends supported by a frame and with an outer gear at an intermediate portion thereof, and a hub shell surrounding the outer gear and having a third ratchet ring and a second key protrusion formed on an inner peripheral surface of one side of the hub shell rotatably secured on the hub shaft;
a first travel unit including a driver rotatably supported by the hub shaft while closing the other side of the hub shell and formed with second pawls on an outer peripheral surface of one side thereof, and a driven sprocket for rotating the driver by receiving power from a driving sprocket;
a second travel unit provided within the hub shell, and including, at one side thereof, third pawls for selectively rotating the hub shell while being engaged with the third ratchet ring, and a carrier mounted with a plurality of planetary gears engaged and rotated with the outer gear; and
a conversion unit interposed between the first and second travel units, and including a ring gear having an inner gear engaged with the planetary gears at one side thereof and a first key protrusion at the other side thereof, and a bush provided between the first and second key protrusions, thereby selectively transmitting the rotational force from the driver to the carrier or the hub shell.

2. The automatic speed changing device as claimed in claim 1, wherein two or more first key protrusions are formed equidistantly on an outer peripheral surface of the ring gear, two or more second key protrusions are formed equidistantly on an inner peripheral surface of the hub shell, and the bush interposed between the outer peripheral surface of the ring gear and the inner peripheral surface of the hub shell has inner key protrusions corresponding to the first key protrusions and outer key protrusions corresponding to the second key protrusions, which are formed equidistantly on an inner peripheral surface and an outer peripheral surface of the bush, respectively.

3. The automatic speed changing device as claimed in claim 1, wherein an inner peripheral surface of the driven sprocket is formed with a first ratchet ring having a plurality of first ratchet recesses formed along the inner peripheral surface of the driven sprocket, and a plurality of first pawls selectively coming into close contact with the first ratchet recesses of the first ratchet ring to rotate the driver are mounted on an outer peripheral surface of the driver extending to the exterior of the hub shell.

4. The automatic speed changing device as claimed in claim 1, wherein the hub shell takes a shape with both open ends, one side of the hub shell is rotatably secured on the hub shaft by means of a first conical nut, an inner peripheral surface of an intermediate portion of the hub shell is formed integrally with the third ratchet ring having a plurality of third ratchet recesses formed along the inner peripheral surface of the hub shell, and an inner peripheral surface of the other side of the hub shell is formed with the inwardly protruding second key protrusion.

5. The automatic speed changing device as claimed in claim 4, wherein the driver is rotatably secured on the hub shaft by means of a second conical nut, the driven sprocket is mounted on the other side of the driver exposed to the exterior of the hub shell, and a plurality of second pawls for rotating the ring gear are mounted on an outer peripheral surface of the driver extending into the hub shell.

6. The automatic speed changing device as claimed in claim 5, wherein an inner peripheral surface of the carrier is placed while enclosing the outer gear, an outer peripheral surface of the carrier is positioned to be close to the inner gear, the plurality of planet gears are arranged in a radial direction on the outer peripheral surface of the carrier to be engaged and rotated with the outer gear and the inner gear, and the plurality of third pawls selectively coming into close contact with the third ratchet recesses of the third ratchet ring to rotate the hub shell are mounted on an outer peripheral surface of one side of the carrier.

7. The automatic speed changing device as claimed in claim 5, wherein an inner peripheral surface of the one side of the ring gear is formed integrally with a second ratchet ring having a plurality of second ratchet recesses selectively coming into close contact with the second pawls, and an outer peripheral surface of the ring gear is formed with the first key protrusion that revolves and then transmits the rotational force to the second key protrusion after rotation through a predetermined amount of rotation via the bush.

8. The automatic speed changing device as claimed in claim 7, wherein in case of a high-speed travel state through rotation of the driven sprocket above a predetermined amount of rotation, if the driven sprocket is stopped, the second key protrusion revolves while the hub shell continues to rotate, thereby performing automatic conversion into a low-speed travel state.

* * * * *

(12) INTER PARTES REEXAMINATION CERTIFICATE (0256th)
United States Patent
Yoo

(10) Number: US 7,503,868 C1
(45) Certificate Issued: Apr. 12, 2011

(54) AUTOMATIC SPEED CHANGING DEVICE

(75) Inventor: Moon-Soo Yoo, Cheongju-si (KR)

(73) Assignee: MBI Co., Ltd., Heungduk-Gu, Cheongju-Si, Chungcheongbuk-Do (KR)

Reexamination Request:
No. 95/001,213, Jul. 24, 2009

Reexamination Certificate for:
Patent No.: 7,503,868
Issued: Mar. 17, 2009
Appl. No.: 12/012,553
Filed: Feb. 4, 2008

Related U.S. Application Data

(62) Division of application No. 11/346,995, filed on Feb. 3, 2006, now Pat. No. 7,351,180, which is a continuation of application No. PCT/KR2004/001979, filed on Aug. 6, 2004.

(30) Foreign Application Priority Data

Aug. 6, 2003 (KR) .................. 10-2003-0054415
Aug. 29, 2003 (KR) .................. 10-2003-0060167
Aug. 2, 2004 (KR) .................. 10-2004-0060949

(51) Int. Cl.
*F16H 3/44* (2006.01)

(52) U.S. Cl. ....................... 475/297; 475/270

(58) Field of Classification Search ................. 475/269, 475/270, 296, 297, 293
See application file for complete search history.

(56) References Cited

U.S. PATENT DOCUMENTS

| | | | |
|---|---|---|---|
| 3,366,206 A | 1/1968 | Shimano |
| 3,432,013 A | 3/1969 | Matsumoto |
| 5,855,530 A | 1/1999 | Huang et al. |
| 6,558,288 B2 | 5/2003 | Okochi |

*Primary Examiner*—Matthew C. Graham

(57) ABSTRACT

Disclosed is an automatic speed changing device in which speed is automatically changed according to a predetermined amount of rotation without user's arbitrary manipulations. The automatic speed changing device of the present invention comprises a hub unit including a hub shaft formed with a sun gear, and a hub shell surrounding the sun gear and having a first ratchet ring and an inner gear formed on an inner peripheral surface of the hub shell; a first travel unit including a driver for rotating the hub shell while closing the other side of the hub shell, and a driven sprocket for rotating the driver by receiving power from a driving sprocket; a second travel unit including a first carrier disposed within the hub shell and mounted at one side thereof with a plurality of planetary gears engaged with the sun gear and the inner gear to rapidly rotate the hub shell, and a second carrier extending from the other side of the first carrier to the driver; and a conversion unit including a second ratchet ring interposed between the driver and the second carrier to transmit rotational force from the rotating driver to the second carrier and the planetary gears of the first carrier, and a conversion spring interposed between the first and second carriers to return the second ratchet ring when pedals of a bicycle are not operated and the bicycle is stopped.

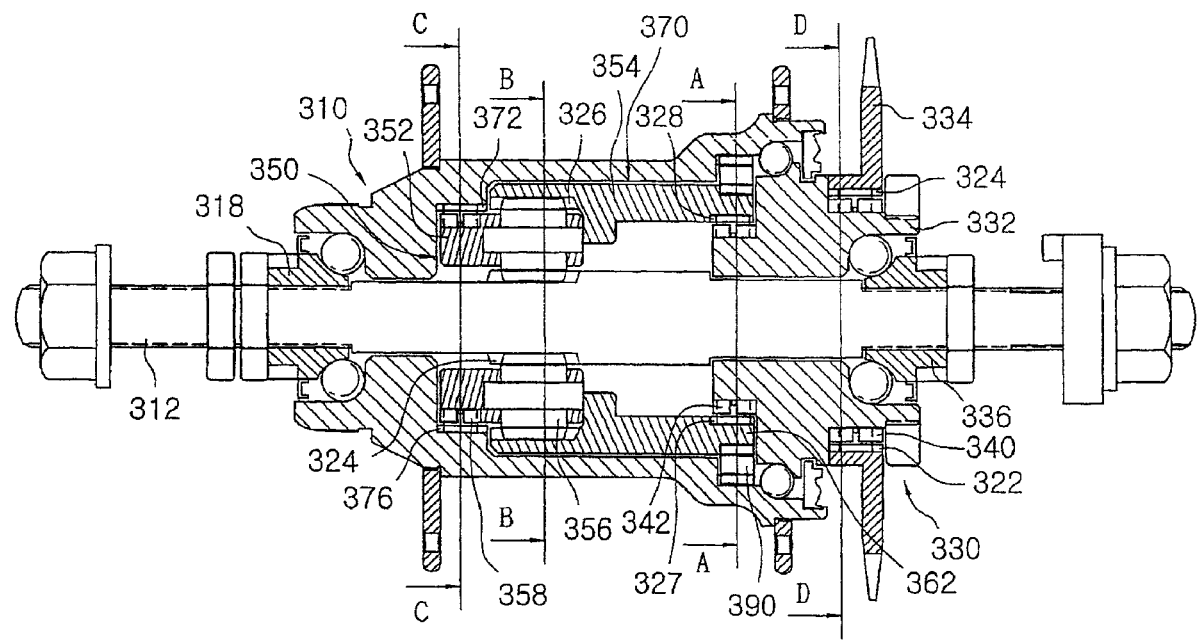

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-8 are cancelled.

\* \* \* \* \*